United States Patent [19]
Yeh

[11] Patent Number: 6,038,580
[45] Date of Patent: Mar. 14, 2000

[54] DCT/IDCT CIRCUIT

[75] Inventor: Chia-Yow Yeh, Chang-Hua Hsien, Taiwan

[73] Assignee: Winbond Electronics Corp., Hsinchu, Taiwan

[21] Appl. No.: 09/027,941

[22] Filed: Feb. 23, 1998

[30] Foreign Application Priority Data

Jan. 2, 1998 [TW] Taiwan ................................. 87100031

[51] Int. Cl.⁷ .................................................. G06F 17/14
[52] U.S. Cl. ........................................... 708/402; 708/401
[58] Field of Search ................................. 708/400–409, 708/820–821

[56] References Cited

U.S. PATENT DOCUMENTS

| | | | |
|---|---|---|---|
| 5,410,500 | 4/1995 | Ohki | 708/401 |
| 5,420,811 | 5/1995 | Ohki | 708/402 |
| 5,544,091 | 8/1996 | Watanabe | 708/400 |
| 5,590,066 | 12/1996 | Ohki | 708/401 |
| 5,673,214 | 9/1997 | Kim et al. | 708/402 |

*Primary Examiner*—Tan V. Mai
*Attorney, Agent, or Firm*—Ladas & Parry

[57] ABSTRACT

A Discreet Cosine Transform (DCT) circuit consisting of a pipe-lined Single Instruction stream, Multiple Data stream (SIMD) processor array, a transpose memory and a control circuit is provided by exploiting the row-column decomposition method, wherein the processor array is capable of computing one dimensional DCT. In an N-point DCT application, the processor array consists of N PEs (processor elements), each of which can compute a N/2-point inner product. Instead of a conventional Multiplexed Analogue Components (MAC) design, the present DCT circuit computes the N/2-point inner product by a word-parallel bit-serial method, which uses N/2 Read Only Memory (ROM) tables, a Wallace tree and one carry propagate adder. This implementation achieves cost-saving and better timing in comparison to a MAC design. Meanwhile, the circuit also has the advantages of simple data routing, regular structure and modular design, and is suitable for Very Large Scale Integration (VLSI) implementation.

15 Claims, 6 Drawing Sheets

DCT/IDCT CIRCUIT

FIELD OF THE INVENTION

The present invention relates to a DCT/IDCT circuit, which is suitable for VLSI implementation and has the advantages of simple data routing, regular structure and modular design.

BACKGROUND OF THE INVENTION

In recent years, many proposed image compression standards have been DCT based algorithms, such as MPEG-1, MPEG-2, H.261, H.263, JPEG and so on. Consequently, the discrete cosine transform (DCT) has become a primitive function in image compression chips. Since DCT needs a large amount of multiplication, large hardware costs are incurred for real time applications.

The Discrete Cosine Transform (DCT) is an orthogonal transform consisting of a set the basis of which is sampled cosine functions. A generalized two dimension DCT is defined as below:

$$F(u, v) = \frac{2}{N} C(u)C(v) \sum_{x=0}^{N-1} \sum_{y=0}^{N-1} f(x, y) \cos\left[\frac{(2x+1)u}{2N}\pi\right] \cos\left[\frac{(2y+1)v}{2N}\pi\right] \quad (1)$$

where $f(x, y)$ is a 2-D data sequence and $C(i) = \begin{cases} \frac{1}{\sqrt{2}}, & i = 0 \\ 1, & i \neq 0. \end{cases}$ Similarly, the Inverse Discrete Cosine Transform (IDCT) is given by:

$$f(x, y) = \frac{2}{N} C(u)C(v) \sum_{u=0}^{N-1} \sum_{v=0}^{N-1} F(u, v) \cos\left[\frac{(2x+1)u}{2N}\pi\right] \cos\left[\frac{(2y+1)}{2N}\pi\right] \quad (2)$$

where $F(u, v)$ is the 2-D transformed data sequence and $$C(i) = \begin{cases} \frac{1}{\sqrt{2}}, & i = 0 \\ 1, & i \neq 0. \end{cases}$$

These two equations are standard separable two-dimensional even cosine transforms and are implemented by row-column decomposition methods in traditional DCT/IDCT circuits, wherein the N×N 2-D DCT can be achieved by a N-point 1-D DCT. The forward and inverse 1-D DCT are given by:

$$F(u) = \sqrt{\frac{2}{N}} C(u) \sum_{x=0}^{N-1} f(x) \cos\left[\frac{u(2x+1)}{2N}\pi\right] \quad (3)$$

$$f(x) = \sqrt{\frac{2}{N}} C(u) \sum_{u=0}^{N-1} F(u) \cos\left[\frac{u(2x+1)}{2N}\pi\right]. \quad (4)$$

So, various fast algorithms have been introduced for reducing the amount of multiplication involved in this transform. These algorithms usually form a butterfly structure in a flow diagram. This butterfly structure has many drawbacks in IC implementation, such as irregular structure and complex data routing which may require large silicon area and longer design time. Moreover, since multiple stages of multipliers are accompanied by rounding or truncation in finite precision arithmetic, fixed internal precision can cause the resulting accuracy to be seriously reduced.

As a result of much effort, several designs on DCT have been developed in past decades. Peter. A. etc., in "A High Performance Full-Motion Video Compression Chipset", published in "IEEE Transaction Circuits and Systems For Video Technology" Vol.2 NO.2 June 1992, pp. 111–122, presented the DCT circuit implemented by 4-point inner product and Wallace tree skill and disclosed that 20% of the hardware could be saved. Min-Ting Sun etc., in "VLSI Implementation of 16×16 Discrete Cosine Transform" published in "IEEE Transaction Circuits and Systems" Vol.36 NO.4 April 1989 pp.610–617, showed a concurrent architecture on DCT with 32 PEs and a RAM performing 16×16 transposition by exploiting distribute arithmetic. A SIMD-systolic architecture for DCT realized by butterfly algorithm is presented in "A SIMD-Systolic Architecture and VLSI Chips for the two dimensional DCT and IDCT" published in "IEEE Transaction Consumer Electronics" Vol.39 NO.4 Nov. 1993, pp.859–869 by Chen-Mie Wu and Auchy Chiou. Yi-Feng Tang etc. designed a DCT circuit by exploiting a fast DCT algorithm and multiplier-accumulator based on this distribute algorithm. Transpose memory inserted between each dimension of DCT is partitioned in order to reduce further hardware overheads. This design is pressed on "A 0.8u 100 MHz 2-D DCT Core Processor" published in "IEEE Transaction on Consumer Electronics" Vol.40 NO.3 August 1994.

In fact, there are still many issues which should be taken into consideration in IC implementation, such as those raised by the performing of both forward and inverse transforms, the complexity of the control circuit logic and the number of data storage and shuffling elements.

Therefore, an object of the present invention is to provide a DCT/IDCT circuit, which is suitable for VLSI implementation and has the advantages of low hardware costs, high efficiency and a regular structure.

SUMMARY OF THE INVENTION

To achieve the above-indicated objects and others, the present invention provides a DCT/IDCT circuit. This circuit consists of a pipe-lined SIMD processor array, a transpose memory and a control circuit. The processor array is capable of computing 1-D DCT. Furthermore, a N×N two dimensional data is computed by exploiting the row-column decomposition method.

In N-point DCT application, the processor array consists of N PEs (processor elements), where each is capable of computing an N/2 point inner product. Instead of the traditional multiplier-accumulator (MAC) design, the present processor computes the N/2-point inner product by the word-parallel bit-serial method. With N/2 ROM tables, a Wallace tree and a carry propagate adder, each PE can compute N/2-point inner product based on this method. This implementation achieves a cost-saving and better timing in comparison to conventional MAC design. Meanwhile, the DCT circuit also has the advantages of simple data routing, regular structure and modular design. These advantages mean that the circuit is suitable for VLSI implementation.

BRIEF DESCRIPTION OF THE DRAWINGS

The following detailed description, given by way of example and not intended to limit the invention solely to the embodiments described herein, will best be understood in conjunction with the accompanying drawings, in which.

DESCRIPTION OF THE PREFERRED EMBODIMENT

The present DCT/IDCT circuit is designed for evaluating these two equations efficiently without losing the regular property. And a halved amount of multiplication in equations (3), (4) is obtained by:

$$F(u) = \sqrt{\frac{2}{N}} \, C(u) \sum_{x=0}^{\frac{N}{2}-1} [f(x) \pm f(N-1-x)] \cos\left[\frac{u(2x+1)}{2N}\pi\right] \quad (5)$$

and $f(x) = f_{even}(x) + f_{odd}(x)$, where $$f_{even}(x) = \sqrt{\frac{2}{N}} \sum_{u=0}^{\frac{N}{2}-1} C(2u)F(2u)\cos\left[\frac{2u(2x+1)}{2N}\pi\right] \quad (6)$$

$$f_{odd}(x) = \sqrt{\frac{2}{N}} \sum_{u=0}^{\frac{N}{2}-1} C(2u+1)F(2u+1)\cos\left[\frac{(2u+1)(2x+1)}{2N}\pi\right] \quad (7)$$

When the identities $f_{even}(x)=f_{even}(N-1-x)$ and $f_{odd}(x)=f_{odd}(N-1-x)$ are used.

Figure 1:
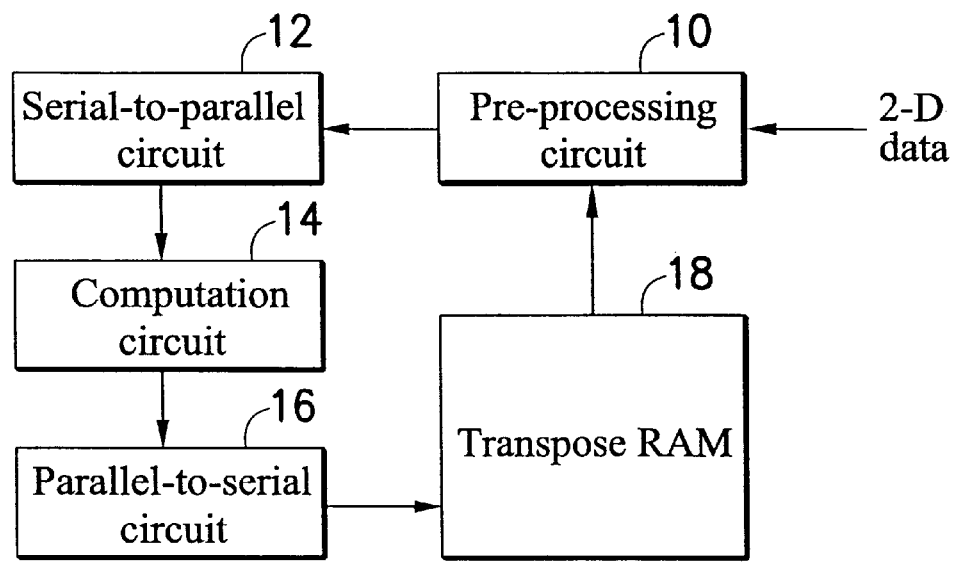
FIG. 1 is a data flow diagram in discrete cosine transform (DCT) mode according to the present invention.

FIG. 1 is a data flow diagram in forward discrete cosine transform (DCT) mode according to the present invention. For an N×N 2-D data, the present DCT circuit is made up four stages: a pre-processing circuit 10, a serial-to-parallel circuit 12, a computation circuit 14 and a parallel-to-serial circuit 16.

The pre-processing circuit 10 receives 2-D data (represented by f(x,y), where $0 \leq x,y \leq N$) from the input terminal column-wise by the order of $$\left\{f(0, j), f(N-1, j), f(1, j), \ldots, f\left(\frac{N}{2}-1, j\right), f\left(\frac{N}{2}, j\right)\right\}$$

and serially produces the terms $$\{f(i, j) + f(N-1-i, j), f(i, j) - f(N-1-i, j)\},$$

where $$i = 0 \cdots \frac{N}{2} - 1.$$

Then, these terms are fed to the serial-to-parallel circuit 12. After all the data in the current column has been processed and fed into the serial-to-parallel circuit 12, the terms are put into the computation circuit 14. This circuit 14 generates the final result F(i,j) by evaluating the equation (5). When completing the computation, the results are fed into the parallel-to-serial circuit 16 simultaneously. Finally, the results are stored in a transpose-RAM 18 one after one.

Figure 3:
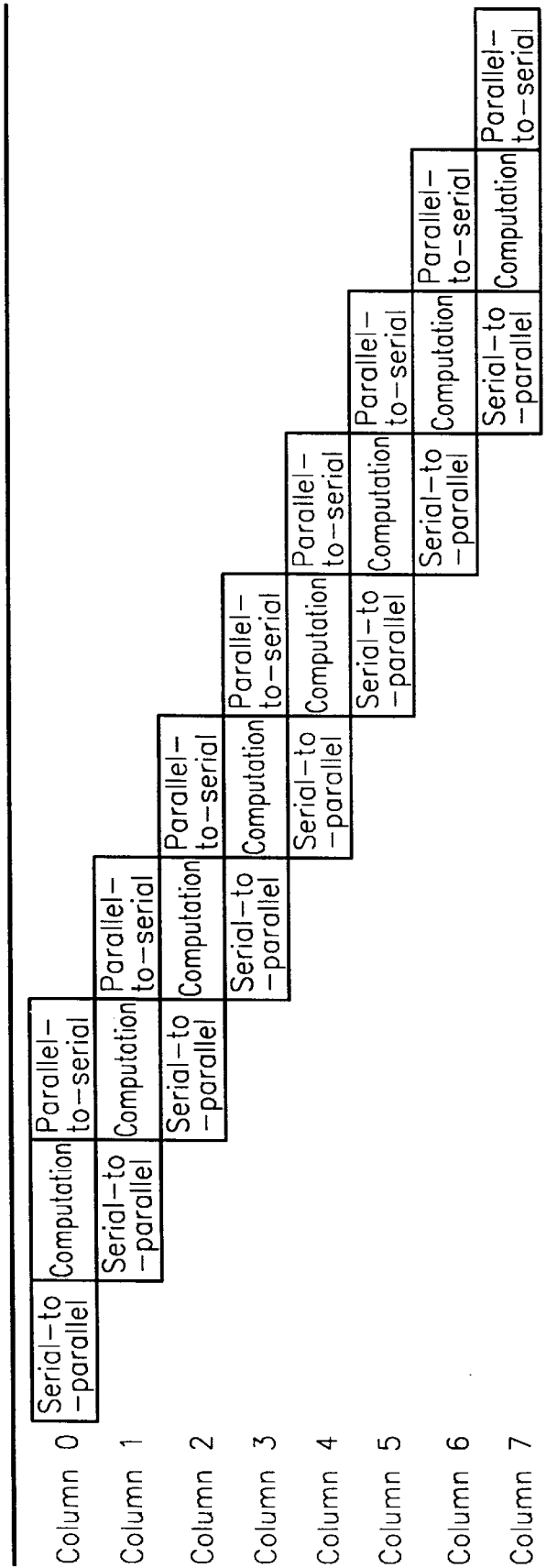
FIG. 3 is a data sequence of the discrete cosine transform according to the present invention.

The pipe-lined mechanism is described briefly below. When the j-th column data is computed by the computation circuit 14, the serial-to-parallel circuit 12 is idle. This implies it can receive the 2-D data, the (j+1)th column, from the pre-processing circuit 10. However, the parallel-to-serial circuit 16 still stores the (j−1)th column result to the transpose-RAM 18 one after one. So, the data goes through the four stages one column after one column and never stops. FIG. 3 is the data sequence diagram in this case. The first pass of 2-D DCT is complete after the (N-1)th column data has been processed and written to the transpose-RAM 18.

Figure 2:
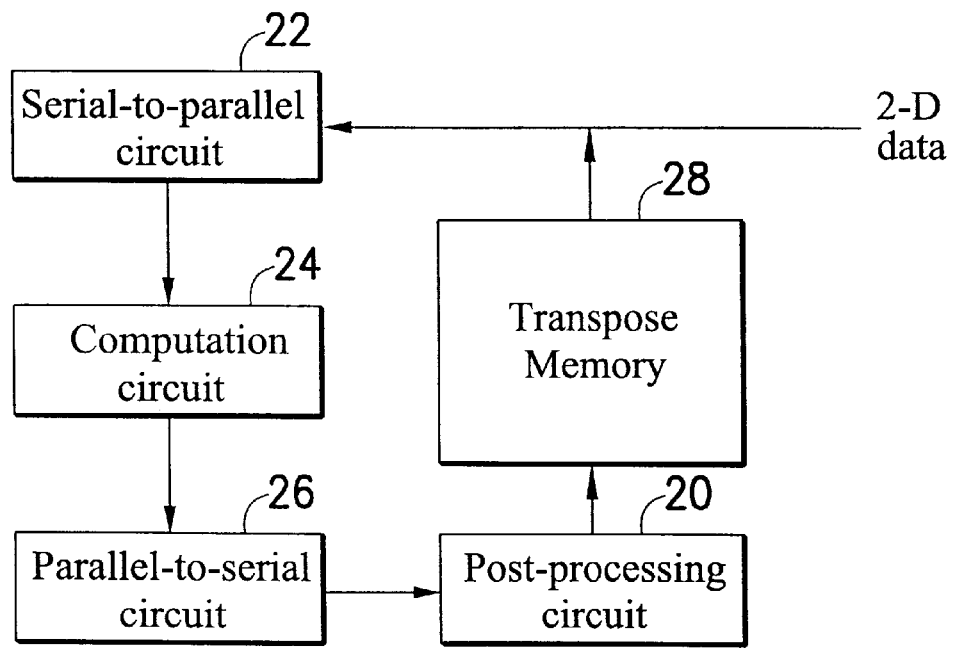
FIG. 2 is a data flow diagram in inverse discrete cosine transform (IDCT) mode according to the present invention.

Instead of receiving the data column-wise, the pre-processing circuit 10 receives the data from the transpose-RAM 18 row-wise via the second pass DCT procedures, which are the same as the first pass procedures. The 2-D DCT is complete when the second pass procedures are finished. The IDCT procedures are similar to the DCT procedures. They are only different in one stage, that involving the pre-processing circuit 10 and the post-processing circuit 20. The DCT should "pre-process" the 2-D data before it is fed into the serial-to-parallel circuit 12. In contrast, the IDCT "post-processed" the data generated by the computation circuit 24 before putting it into the next stage, the transpose RAM 28. FIG. 2 depicts the data flow diagram in inverse discrete cosine transform (IDCT) mode according to the present invention.

During the first pass procedures, the serial-to-parallel stage receives the data column-wise by the order of $$\left\{f(0, j), f(N-1, j), f(1, j), \ldots, f\left(\frac{N}{2}-1, j\right), f\left(\frac{N}{2}, j\right)\right\}$$

and feeds it to the computation circuit 24 after all the data in the current column has been processed and fed into the serial-to-parallel circuit 22. The computation circuit 24 then produces the inner product terms $f_{even}(x)$ and $f_{odd}(x)$ by evaluating the equations (6) and (7). The inner product terms are outputted to the post-processing circuit 20 through the parallel-to-serial circuit 26. The post-processing circuit 20 then adds and subtracts the inner product terms $f_{even}(x)$, $f_{odd}(x)$ to obtain the result stored in the transpose-RAM 28.

Instead of receiving the 2-D data column-wise, the serial-to-parallel circuit 22 receives the data from the transpose-RAM 28 row-wise via the second pass IDCT procedures, which are the same as the first pass procedures. The 2-D IDCT is complete when the second pass procedures have been finished.

Figure 4:
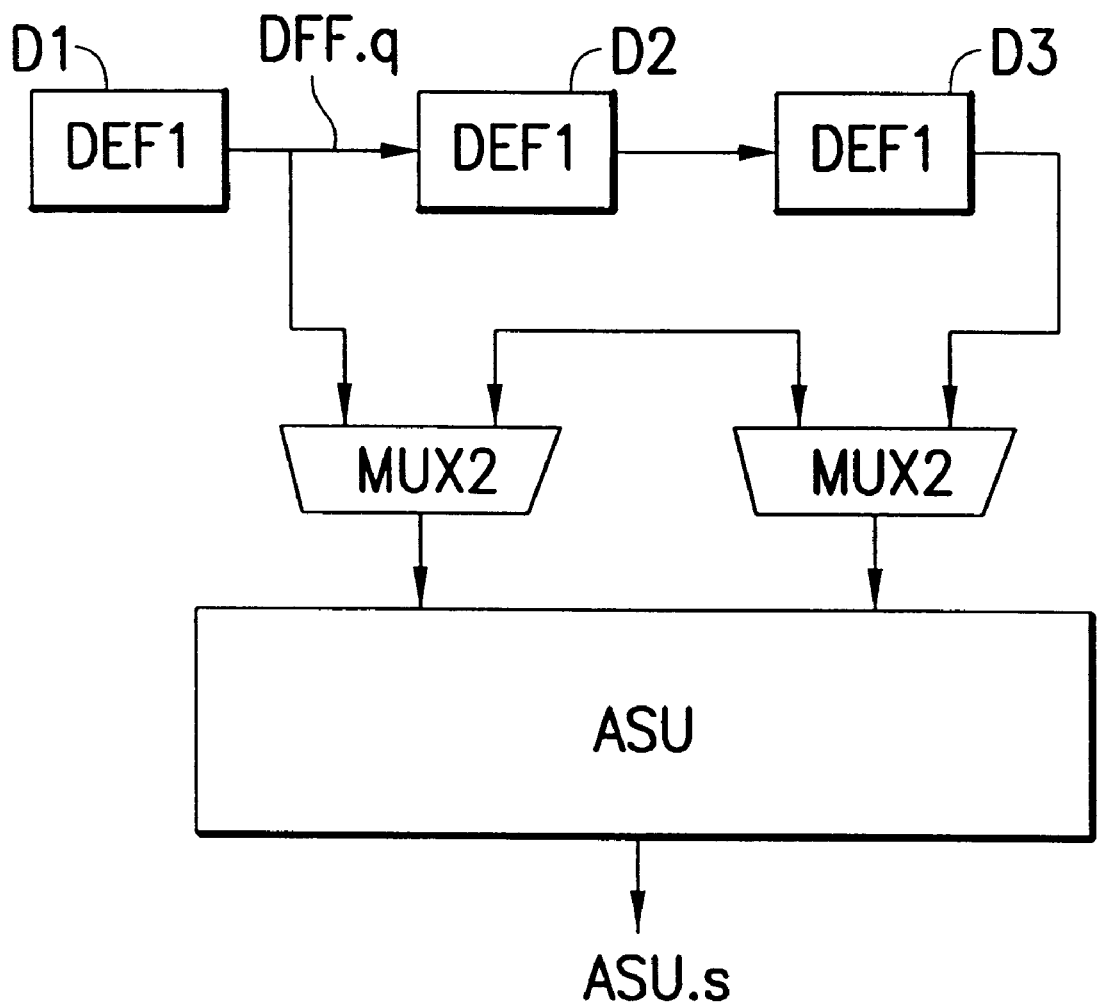
FIG. 4 is a circuit diagram of the pre/post processing circuit according to the present invention.
Figure 5:
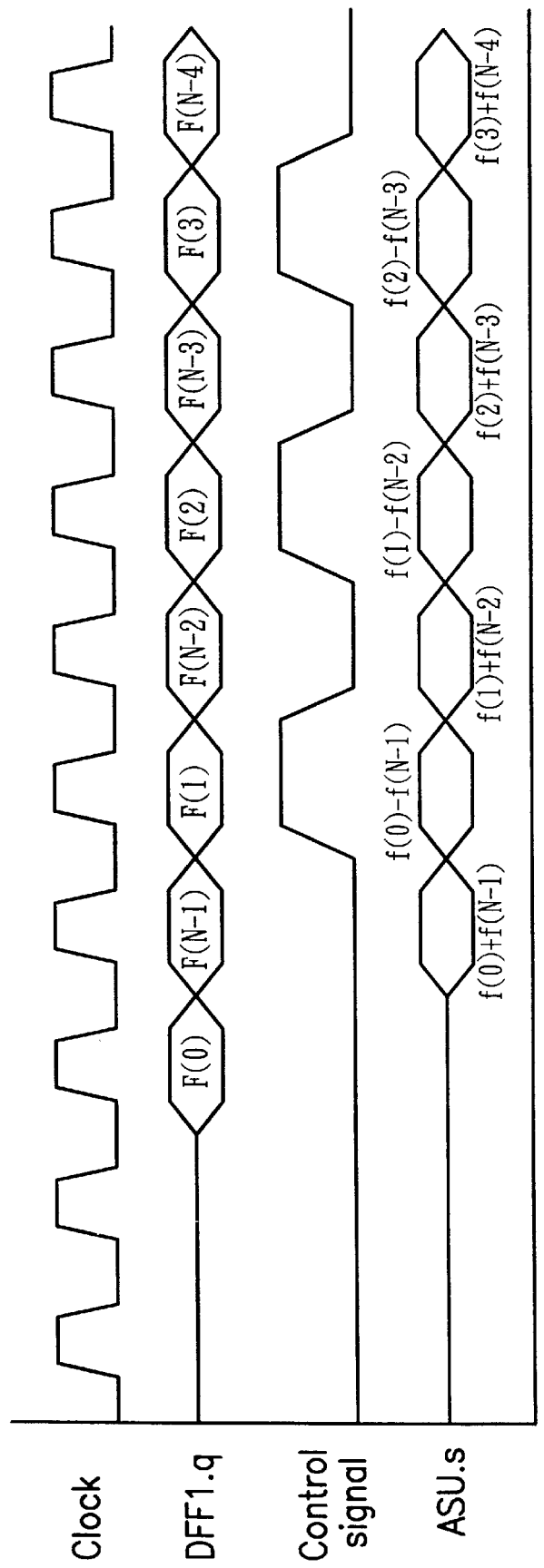
FIG. 5 is a controlled sequence of the pre/post processing circuit according to the present invention.

Moreover, the pre-processing circuit 10 and the post-processing circuit 20 share the same hardware resources. FIG. 4 is a circuit diagram of the pre/post processing circuit according to the present invention. The pre/post processing circuit consists of three D flip flops D1, D2, D3 connected in series and receives the data according to a control signal (not shown). The pre/post processing circuit 10/20 also includes an adder ASU to process the results from the D flip flops so that the pre-processed or post-processed data can be obtained. FIG. 5 is a controlled sequence in DCT mode, wherein DFF 1.q represents the output waveform of the D flip flop D1 and ASU.s represents the output waveform of the adder ASU. However, the same mechanism can be applied in IDCT mode.

For clarity, an 8×8 2-D DCT, with the word length of the fixed-point number being 20, is used in this case as an example. The DCT and IDCT according to the previous definition are:

$$F(u) = \frac{1}{2}C(u)\sum_{x=0}^{3}[f(x) \pm f(7-x)]\cos\left[\frac{u(2x+1)}{16}\pi\right]$$

$$f(x) = f_{even}(x) + f_{odd}(x), \text{ where}$$

$$f_{even}(x) = \frac{1}{2}\sum_{u=0}^{3}C(2u)F(2u)\cos\left[\frac{2u(2x+1)}{16}\pi\right]$$

$$f_{odd}(x) = \frac{1}{2}\sum_{u=0}^{3}C(2u+1)F(2u+1)\cos\left[\frac{(2u+1)(2x+1)}{16}\pi\right]$$

Figure 6:
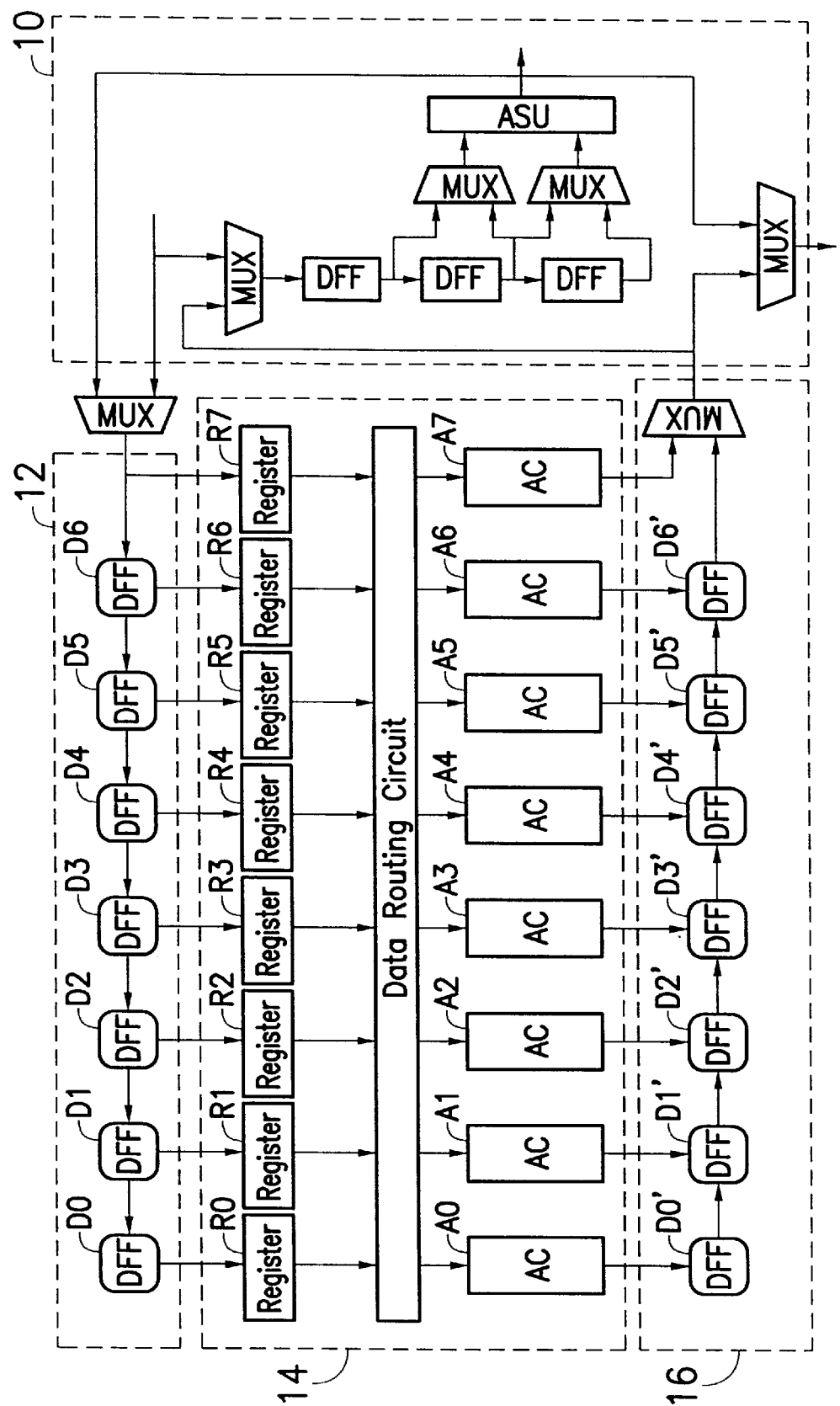
FIG. 6 is a circuit diagram of the pipe-lined SIMD DCT/IDCT circuit according to the present invention.
Figure 7:
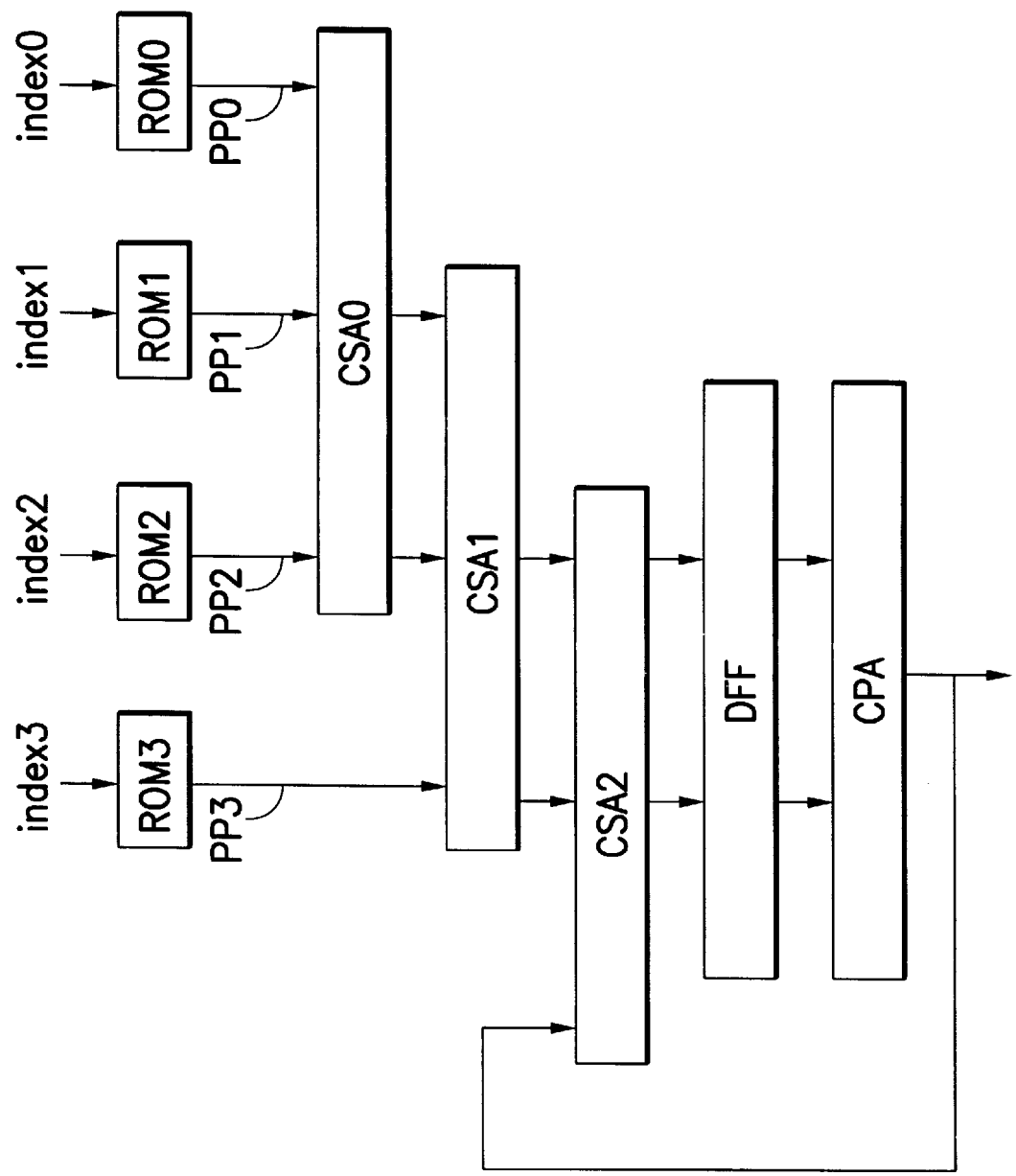
FIG. 7 is a circuit diagram of the accumulators according to the present invention.

Based on SIMD architecture, these equations are evaluated by 8 PEs concurrently. Each PE performs the function of 4-point inner product. FIG. 6 shows the pipe-lined SIMD DCT/IDCT circuit of the present invention. In DCT mode, the serial-to-parallel circuit 12 and the parallel-to-serial circuit 16 are respectively made up 7 D flip flops (D0~D6 and D0'~D6'). And the computation circuit 14 is made up 8 registers (R0~R7) and 8 ROM accumulators (A0~A7). FIG. 7 shows the circuit diagram of the 4-point inner product. The 4-point inner product circuit is designed in accordance with the word-parallel bit-serial method. For example, PP0, PP1, PP2, PP3 are the partial product terms of $$[f(0)-f(7)]\cos\left(\frac{1}{16}\pi\right), [f(1)-f(6)]\cos\left(\frac{3}{16}\pi\right),$$

$$\ldots, [f(3)-f(4)]\cos\left(\frac{7}{16}\pi\right)$$

respectively. However, the whole circuit is pipe-lined. The serial-to-parallel circuit 12 and the parallel-to-serial circuit 16 eclipse 8 cycles per column for receiving the data. Evidently, the computation circuit 14 should complete the computation within 8 cycles for each column. A fast multiplier based on a 4-bit-overlap-1 recording scheme is applied to meet the requirement. Table. 1 depicts the recording scheme. The ICAND is substituted by the cosine coefficient. These tables are recorded in 32 ROMs. The partial sum are added by the carry saved adders CSA0,CSA1,CSA2 and accumulated by a carry propagate adder CPA finally.

In summation, the DCT/IDCT circuit of the present invention has the advantages of lower hardware costs, simpler data routing (due to the pre/post processing circuit 10/20) and higher efficiency (due to the ROM accumulators AC0–AC7). In addition, the modular design is also suitable for VLSI implementation.

TABLE I

| Overlap bit $X_{j+3}$ | Current triplet $X_{j+2}X_{j+1}X_j$ | Action in position j |
|---|---|---|
| 0 | 0 0 0 | None |
| 0 | 0 0 1 | +2 × ICAND |
| 0 | 0 1 0 | +2 × ICAND |
| 0 | 0 1 1 | +4 × ICAND |
| 0 | 1 0 0 | +4 × ICAND |
| 0 | 1 0 1 | +6 × ICAND |
| 0 | 1 1 0 | +6 × ICAND |
| 0 | 1 1 1 | +8 × ICAND |
| 1 | 0 0 0 | −8 × ICAND |
| 1 | 0 0 1 | −6 × ICAND |
| 1 | 0 1 0 | −6 × ICAND |
| 1 | 0 1 1 | −4 × ICAND |
| 1 | 1 0 0 | −4 × ICAND |
| 1 | 1 0 1 | −2 × ICAND |
| 1 | 1 1 0 | −2 × ICAND |
| 1 | 1 1 1 | None |

The foregoing description of a preferred embodiment of the present invention has been provided for the purposes of illustration and description only. It is not intended to be exhaustive or to limit the invention to the precise forms disclosed. Many modifications and variations will be apparent to practitioners skilled in this art. The embodiment was chosen and described to best explain the principles of the present invention and its practical application, thereby enabling those who are skilled in the art to understand the invention for various embodiments and with various modifications as are suited to the particular use contemplated. It is intended that the scope of the invention be defined by the following claims and their equivalents.

What is claimed is:

1. A DCT circuit for forward discrete cosine transforming an N×N data f(x,y), where x,y=0 . . . N-1, comprising:

a preprocessing circuit receiving the N×N data and serially producing first pass modified terms $$\left\{f(0,j) \pm f(N-1,j), f(1,j) \pm f(N-2,j), \ldots, f\left(\frac{N}{2}-1,j\right) \pm f\left(\frac{N}{2},j\right)\right\}$$

where j=O . . . N−1;

a serial-to-parallel circuit receiving the first pass modified terms and outputting them column-wise;

a computation circuit generating first pass transformed data $f_1$(x,y), where x,y=0 . . . N-1, by evaluating the first pass modified terms of the serial-to-parallel circuit; and a parallel-to-serial circuit receiving the first pass transformed data and serially outputting them to a transpose memory;

the pre-processing circuit also receiving the first pass transformed data and serially producing second pass modified terms $$\left\{f_1(i,0) \pm f_1(i,N-1), f_1(i,1) \pm f_1(i,N-2), \ldots,\right.$$

$$\left.f_1\left(i,\frac{N}{2}-1\right) \pm f_1\left(i,\frac{N}{2}\right)\right\},$$

where i=O . . . N−1;

the serial-to-parallel circuit also receiving the second pass modified terms and outputting them column-wise;

the computation circuit also generating second pass transformed data by evaluating the second pass modified terms of the serial-to-parallel circuit; and the parallel-to-serial parallel circuit also receiving the second pass transformed data and serially outputting them as the N×N transformed data.

2. The DCT circuit as claimed in claim 1, wherein the pre-processing circuit receives the N×N data by an order of $$\left\{f(0,j), f(N-1,j), f(1,j), \ldots, f\left(\frac{N}{2}-1,j\right), f\left(\frac{N}{2},j\right)\right\}$$

where j=O . . . N−1, and the pre-processing circuit receives the first pass transformed data by a order of $$\left\{f(i,0), f(i,N-1), f(i,1), \ldots, f\left(i,\frac{N}{2}-1\right), f\left(i,\frac{N}{2}\right)\right\}$$

where i=O . . . N−1.

3. The DCT circuit as claimed in claim 1, wherein the pre-processing circuit comprises:

a plurality of D flip flops connected in series, for receiving the N×N data column-wise or the first pass transformed data row-wise; and a data processor adding and subtracting the N×N data or the first pass transformed data of the D flip flops to obtain the first pass modified terms or the second pass modified terms.

4. The DCT circuit as claimed in claim 1, wherein the computation circuit comprises:

a plurality of registers respectively storing the first pass modified terms or the second pass modified terms;

a plurality of ROM accumulators connected to the registers, for generating the first pass transformed data or the second pass transformed data.

5. The DCT circuit as claimed in claim 4, wherein each of the ROM accumulators comprises:

a plurality of ROM tables respectively outputting a sub-sum corresponding to a bit partition of the first pass modified terms or the second pass modified terms;

a plurality of carry saved adder respectively adding all sub-sums corresponding to the bit partition to obtain a partial sum; and a carry propagate adder adding all partial sums of the carry saved adder to obtain the first pass transformed data or the second pass transformed data.

6. The DCT circuit as claimed in claim 1, wherein the serial-to-parallel circuit comprises a plurality of D flip flops connected in series.

7. The DCT circuit as claimed in claim 1, wherein the parallel-to-serial circuit comprises a plurality of D flip flops connected in series.

8. An IDCT circuit for inverse discrete cosine transforming an N×N data, comprising:

a serial-to-parallel circuit receiving the N×N data and outputting it column-wise;

a computation circuit generating first pass inner product terms by evaluating the N×N data of the serial-to-parallel circuit;

a parallel-to-serial connected to the computation circuit, for serially outputting the first pass inner product terms; and a post-processing circuit receiving and adding/subtracting the first pass inner product terms column-wise to produce a first pass inverse transformed data $$\left\{F(0, j), F(N-1, j), F(1, j) \ldots, F\left(\frac{N}{2}-1, j\right), F\left(\frac{N}{2}, j\right)\right\}$$

stored in a transpose memory, where j=0 . . . N-1;

the serial-to-parallel circuit also receiving the first pass inverse transformed data and outputting it row-wise;

the computation circuit also generating second pass inner product terms by evaluating the first pass inverse transformed data of the serial-to-parallel circuit;

the parallel-to-serial circuit also serially outputting the second pass inner product terms according to the first pass inverse transformed data; and the post-processing circuit also receiving and adding/subtracting the second pass inner product terms column-wise to produce a second pass inverse transformed data $$\left\{f(0, j), f(N-1, j), f(1, j), \ldots, f\left(\frac{N}{2}-1, j\right), f\left(\frac{N}{2}, j\right)\right\}$$

to serve as the N×N inverse transformed data, where j=0 . . . N-1.

9. The IDCT circuit as claimed in claim 8, wherein the serial-to-parallel circuit receives the N×N data and the first pass inverse transformed data serially.

10. The IDCT circuit as claimed in claim 8, wherein the post-processing circuit comprises:

a plurality of D flip flops connected in series, for receiving the first pass inner product terms or the second pass inner product terms; and a data processor adding and subtracting the first pass inner product terms or the second inner product to obtain the first pass inverse transformed data or the N×N inverse transformed data.

11. The IDCT circuit as claimed in claim 8, wherein the computation circuit comprises:

a plurality of registers respectively storing the N×N data or the first pass inverse transformed data column-wise;

a plurality of ROM accumulators connected to the registers, for generating the first pass inner product terms or the second pass inner product terms.

12. The IDCT circuit as claimed in claim 11, wherein each of the ROM accumulators comprises:

a plurality of ROM tables respectively outputting a sub-sum corresponding to a bit partition of the N×N data or the first pass inverse transformed data;

a plurality of carry saved adder respectively adding all sub-sums corresponding to the bit partition to obtain a partial sum; and a carry propagate adder adding all partial sums of the carry saved adder to obtain the first pass inner product terms or the second pass inner product terms.

13. The IDCT circuit as claimed in claim 8, wherein the serial-to-parallel circuit comprises a plurality of D flip flops connected in series.

14. The IDCT circuit as claimed in claim 8, wherein the parallel-to-serial circuit comprises a plurality of D flip flops connected in series.

15. A DCT/IDCT circuit for forward/inverse discrete cosine transforming an N×N data, comprising:

a transpose memory storing first pass transformed data in DCT mode and first pass inverse transformed data in IDCT mode;

a pre/post processing circuit receiving and adding/subtracting the N×N data or the first pass transformed data in DCT mode to produce first pass modified terms or second pass modified terms;

a serial-to-parallel circuit receiving the first pass modified terms or the second pass modified terms in DCT mode and the N×N data or the first pass inverse transformed data in IDCT mode, and outputting them column-wise;

a computation circuit generating the first pass transformed data or second pass transformed data in DCT mode by evaluating the first pass modified terms or the second pass modified terms obtained from the serial-to-parallel circuit, and generating first inner product terms or second product terms in IDCT mode by evaluating the N×N data or the first pass inverse transformed data obtained from the serial-to-parallel circuit; and a parallel-to-serial circuit receiving the first pass transformed data or the second pass transformed data in DCT mode to serially produce the first pass transformed data stored in the transpose memory or the N×N transformed data, and serially outputting the first inner product terms or the second inner product terms obtained from the computation circuit;

the pre/post processing circuit also receiving and adding/subtracting the first inner product terms or the second inner product terms in IDCT mode to produce the first pass inverse transformed data stored in the transpose memory or the N×N inverse transformed data.

* * * * *